United States Patent Office 3,004,852
Patented Oct. 17, 1961

3,004,852
METHOD OF PREPARING AN ANIMAL FEED OF HIGH FAT CONTENT
David E. Rothschild, 4 Clinton Place, Millburn, N.J.
No Drawing. Filed Dec. 23, 1959, Ser. No. 861,441
2 Claims. (Cl. 99—7)

My invention relates generally to animal feeds with high fat content, and specifically, to animal feeds with high fat content that have the physical characteristics of fat-free or low-fat protein feeds. The physical characteristics of animal feeds have been established for a long time, and the need for such animal feeds has been filled by a high-protein, low-fat animal feed. The content of prepared animal feeds has changed with increased knowledge of the necessity for including other nutrients (fats) normally not included in such feeds. From the inclusion of theses other nutrients, production problems arise.

High-protein, low-fat animal feeds have the following desirable characteristics:

(1) They are easily packaged and shipped because the feed may be pelletized and is chemically stable; the components of the feed do not deteriorate, do not separate, nor do the pellets ordinarily crumble with the passage of time, with the normal forces exerted upon the packages during the course of shipment, and with wide fluctuations in temperature. These qualities should exist with both pelletized and unpelletized feeds.

(2) They can be stored at a wide range of conditions as to temperature, pressure, and over extensive periods of time, with little or no deterioration in quality.

(3) They may be easily handled, distributed, and mixed with other feed supplements, since they are free-flowing at all temperatures normally encountered incidental to their use, and do not tend to compact into larger lumps.

(4) They may be prepared in granular form and the particle will pass through U.S. 10-mesh screens and substantially maintain the particle size thereafter until dispensed and consumed.

(5) They are fat-free or low in fat content. Fat is an ingredient of the raw material from which animal by-product protein feeds are prepared, and since the fat is of greater value than the remainder of the raw material, and was formerly considered an unnecessary food ingredient, it has been in the past, considered economically desirable to remove the fat as a valuable principal product, and the remaining material being considered the by-product. Such a result is achieved after cooking the raw material to remove much of the water content, and then subjecting the resultant mass to hydraulic pressure, or screw pressing. Solvent extraction methods are also resorted to, and the resultant rupture of the cellular structure of the animal tissues which comprise the raw material from which the animal feed is made, releases the fats for collection. Unfortunately, amino acid content is reduced in this process.

However desirable it may be to the renderer to remove substantially all fat in preparing animal feeds, the animal raiser now has begun to appreciate and demand a fat content in the prepared feed; in the past, this content has not been recognized as important, but it is now being insisted on. In compliance with this demand, when an attempt is made to remove only a portion of the fat and leave a substantial, or at least minimal desirable amount of fat and yet process the feed in the conventional manner, the resultant product has been found to be lacking in each and every one of the desirable characteristics aforementioned:

(1) The product does not lend itself to packaging, since it does not readily form stable pellets, but pellets which are soft and easily disintegrated.

(2) The high-fat content is unstable; with the passage of time and the exertion of pressure, and changes in temperature, the fat tends to separate from the solid protein.

(3) The storage of the product so prepared over a period of time results in this type of deterioration.

(4) The product itself, originally may have a granular particle size, but is difficult to reduce to such a desirable, smaller particle size, so that it will pass through U.S. 10-mesh screen; it tends to compact into larger particles and consequently is not free-flowing.

It is therefore an object of my invention to take the standard animal by-products of the meat industry and process them into a suitable animal feed with a high-fat content.

It is a further object of my invention to provide an animal feed which may be pelletized and consequently readily mixed with other foods.

Yet a further object of my invention is to provide an animal feed which is readily packaged and easily handled, that is stable over widely varying conditions of time, temperature and pressure, that is easily packaged, that has a granular structure sufficiently small to enable it to pass readily through a U.S. 10-mesh screen, that displays no tendency to separate to its individual constituents, to agglomerate, and remains free-flowing under all normally encountered temperature conditions. These objects and advantages, as well as other objects and advantages, may be achieved as hereinafter set forth.

The advent of the synthetic detergent relegating fat for soap manufacture to a position of unimportance, and the more or less coincidental recognition of the necessity for fats in animal feed products, renders it economically feasible to include fats in granular animal feeds. The rendering or cooking of meat by-products is a well-known procedure described in numerous publications, among which is "Better Rendering" (copyright 1949). The procedure generally is to take the by-products of the meat industry consisting of meat, bones, fat and shred them to reduce the mass to particles no larger than one cubic inch in size. This raw material is then placed in a cooker, frequently in batches of perhaps 4,000 pounds, and cooked at a temperature of approximately 240° F. Such cookers are usually provided with a steam jacket so that the temperature of the material in them is raised by the circulation of steam through the jacket. After two to four hours' cooking and agitation, some of the fat is converted to a liquid state, and the remainder is still associated or absorbed by the other materials. Water is given off by the materials and removed, until perhaps there is no more than 2% by weight of water in the entire processed mass. The product, when discharged from the cooker has a somewhat sandy feel, and the fat content may be approximately 35 percent by weight after removal of the free-run fat. To attempt to grind and then to pelletize this animal feed with a 35 percent fat content, more or less, in accordance with ordinary methods such as depositing it in a grinder has not met with success. The resulting ground product lacks the desirable physical characteristics enumerated in paragraphs numbered 1–5 heretofore set forth. In order to achieve the desired characteristics of an animal feed, it has been found to be necessary to remove most of the remaining fats. The resultant product is, of course, an animal feed with a low-fat content. After most of the remaining fats are removed by further cooking, the residue then is able to be ground and has all of the desired qualities as aforementioned. Only the high fat content is missing. The fat which is missing is supplied separately from the feed and is re-added at the time when the feed is to be used in order to bring it in conformity with now accepted standards as to fat content. Obviously, the removal of the fat in order to endow the feed with commercially acceptable physical characteristics, and the subsequent addition of the fat at the time of use is most uneconomical for both the processor and the user of the feed.

Since a high-fat content animal feed cannot be pulverized or pelletized and still have the desirable physical characteristics already referred to, such a processed feed is commercially unacceptable. The inability to pulverize and pelletize such a product and to achieve a suitable feed lies in the limited capacity of the solids in the product to absorb the fats. Efforts to increase the ability of the solids to absorb fat have not resulted in a satisfactory product. It has been found that a solution lies in incorporating with the cooked product, an addition agent to be added at the point where the product is deposited in the grinder. The addition agent shall be of an absorbent type in order to take up the fat which is liberated as free-fat during the pulverizing process and which is not absorbed by the solid material. It is the unabsorbed free-fat that prevents the proper grinding of the processed material. An addition agent which has the desired absorbency and affinity for free-fat liberated during the pulverizing process is hydrated calcium silicate. This material is non-toxic and in addition supplies dietary mineral supplements. Other absorbent materials suitable as addition agents are: solvent extracted vegetable oil seed meals such as peanut meal, cotton seed meal, soy bean meal, corn meal, linseed meal; cereals and siliceous earths may also be used. After being cooked, the proteinaceous mass may absorb approximately 9 to 13 percent of the fat by weight. Procedure then is as follows:

The ground and dehydrated mass is discharged from the cooker by gravity or by any simple conveyor, paddle or scoop action and is placed in a drainage pan having a perforated false bottom so that the solid material will lie on this false bottom and the liquid portion fats drain into the area below the false bottom and be pumped away. In order to speed the draining process, the material may be stirred from time to time. Without the exertion of any pressure upon the mass, the fat content should be stabilized at the end of approximately 30 minutes by the cessation of drainage.

The material is then permitted to return to ambient temperature, at which time processing may proceed. Although lower temperatures are desirable, refrigeration is unnecessary, but forced draft may accelerate the cooling.

The material is then fed into a hammer mill or other suitable grinder. The material should be addressed to the grinding area and as closely thereto as can reasonably be achieved, hydrated calcium silicate should be fed to the grinding surfaces in an enclosed system by a vibrating screw, but without any premixing of the unground feed and the hydrated calcium silicate. Any material that has passed through the grinder and achieved a particle size of minus 10-mesh should be removed and the remainder of the material recycled through the grinder both as to the excess hydrated calcium silicate and the cooked materials including fat. When these materials are returned to the grinder for a second pulverization and when they achieve a minus 10-mesh particle size, they should be removed and those not achieving that particle size should be recycled for a third time at which time they will ordinarily pass through the chosen screen. The product so achieved has all of the desirable characteristics. It may be readily pelletized by ordinary procedures, it has a known fat content and may be mixed with other animal feeds to achieve a ready-to-consume animal feed of known nutritional content. Anti-oxidizing agents may be added immediately before the final grinding with hydrated calcium silicate. The particle size may be even smaller with the use of suitable smaller mesh screens.

In addition to starting my process with products derived from the cooking operation, my process may be started with the filtered cake which remains in filters after tallow filtration has been carried out. Such filter cake lends itself readily for grinding with hydrated calcium silicate to form a highly stable granular material that may be pelletized and has all desirable characteristics of the material cooked in the ordinary way. Thus the wasteful removal of fats and the readdition to the feed at a later date is avoided.

The foregoing procedure is intended to be merely illustrative of one embodiment of my invention for it is contemplated that there may be known equivalents for each of the materials and each of the steps embodied in the process which equivalents may be substituted for the illustrated steps and materials, all within the scope of the appended claims without departing from the spirit of the invention.

Definition

I have referred herein to the preparation of animal feeds. While the product of my invention is an animal feed, and the method described produces an animal feed, it is to be understood that this product's most usual use will be as an ingredient in an animal feed; it will frequently be mixed and blended with other nutrients and then pelletized. Therefore the present invention is not only an animal feed in itself but also an ingredient for animal feeds.

I claim:

1. The method of preparing an animal feed product with a high-fat content with the physical characteristics of low-fat protein foods, comprising depositing cooked, dehydrated quantities of meat, bones, fat, muscles and sinews into a grinder and at the same time depositing into the grinder a separate non-toxic addition agent, having a high co-efficient of fat absorption, grinding the mass to a chosen particle size and removing the desired sized product, recycling the addition agent and the above-standard particles through the grinder and continuing said recycling until all of the ground products have reached the chosen particle size and have been removed.

2. A method of preparing an animal feed product with a high-fat content with physical characteristics of low-fat protein foods, comprising the method in accordance with claim 1, in which the addition agent having a high co-efficient of fat absorption is hydrated calcium silicate.

References Cited in the file of this patent

UNITED STATES PATENTS

| | | |
|---|---|---|
| 1,638,700 | Molofsky | Aug. 9, 1927 |
| 2,558,092 | Kelly et al. | June 26, 1951 |
| 2,708,163 | St. John | May 10, 1955 |